United States Patent
Kim et al.

(10) Patent No.: US 8,861,912 B2
(45) Date of Patent: Oct. 14, 2014

(54) HOLEY OPTICAL FIBER WITH RANDOM PATTERN OF HOLES AND METHOD FOR MAKING SAME

(75) Inventors: Jeong I. Kim, Suwon (KR); Daniel Kominsky, Christiansburg, VA (US); Gary Pickrell, Blacksburg, VA (US); Ahmad Safaai-Jazi, Blacksburg, VA (US); Roger H Stolen, Gallatin, TN (US); Anbo Wang, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 13/476,622

(22) Filed: May 21, 2012

(65) Prior Publication Data
US 2013/0223804 A1 Aug. 29, 2013

Related U.S. Application Data

(63) Continuation of application No. 12/263,831, filed on Nov. 3, 2008, now abandoned, which is a continuation
(Continued)

(51) Int. Cl.
| | |
|---|---|
| *G02B 6/032* | (2006.01) |
| *G02B 6/02* | (2006.01) |
| *C03B 37/027* | (2006.01) |
| *C03C 13/04* | (2006.01) |
| *C03B 37/016* | (2006.01) |
| *C03B 37/012* | (2006.01) |
| *G01L 1/24* | (2006.01) |
| *C03C 11/00* | (2006.01) |

(52) U.S. Cl.
CPC ........ *G02B 6/02385* (2013.01); *G02B 6/02333* (2013.01); *C03B 2203/42* (2013.01); *G02B 6/02366* (2013.01); *C03B 37/02781* (2013.01); *C03C 13/04* (2013.01); *C03B 37/016* (2013.01); *G02B 6/032* (2013.01); *C03B 37/01297* (2013.01); *G02B 6/02295* (2013.01); *G02B 6/02338* (2013.01); *C03B 2203/14* (2013.01); *G01L 1/243* (2013.01); *G02B 6/02357* (2013.01); *C03C 11/007* (2013.01)
USPC .............................. 385/125; 385/32; 385/123

(58) Field of Classification Search
CPC ............... G02B 6/032; G02B 6/02295; G02B 6/02342; G02B 6/02357
USPC .............. 385/32, 123–128, 141–145; 65/385, 65/393, 412, 435
See application file for complete search history.

(56) References Cited

U.S. PATENT DOCUMENTS

| | | |
|---|---|---|
| 2,261,022 A | 10/1941 | Fox et al. |
| 2,978,340 A | 4/1961 | Veatch et al. |

(Continued)

FOREIGN PATENT DOCUMENTS

| | | |
|---|---|---|
| EP | 1564569 | 8/2005 |
| EP | 1617243 | 1/2006 |

(Continued)

OTHER PUBLICATIONS

Pineda, editor, "Selective Plasma Component Removal," Futura Publishing Company, Mount Kisco, NY, 1984, pp. 156.

(Continued)

*Primary Examiner* — Uyen Chau N Le
*Assistant Examiner* — Michael Mooney
(74) *Attorney, Agent, or Firm* — Blank Rome LLP

(57) ABSTRACT

A random array of holes is created in an optical fiber by gas generated during fiber drawing. The gas forms bubbles which are drawn into long, microscopic holes. The gas is created by a gas generating material such as silicon nitride. Silicon nitride oxidizes to produce nitrogen oxides when heated. The gas generating material can alternatively be silicon carbide or other nitrides or carbides. The random holes can provide cladding for optical confinement when located around a fiber core. The random holes can also be present in the fiber core. The fibers can be made of silica. The present random hole fibers are particularly useful as pressure sensors since they experience a large wavelength dependant increase in optical loss when pressure or force is applied.

18 Claims, 5 Drawing Sheets

Related U.S. Application Data of application No. 10/863,805, filed on Jun. 9, 2004, now Pat. No. 7,444,838.

(60) Provisional application No. 60/515,447, filed on Oct. 30, 2003.

(56) References Cited

U.S. PATENT DOCUMENTS

| | | | |
|---|---|---|---|
| 4,038,063 | A | 7/1977 | Williams et al. |
| 5,191,206 | A | 3/1993 | Boiarski et al. |
| 5,627,921 | A | 5/1997 | Lidgard et al. |
| 5,745,611 | A | 4/1998 | Komachiya et al. |
| 5,802,236 | A | 9/1998 | DiGiovanni et al. |
| 5,972,488 | A | 10/1999 | Nagata et al. |
| 6,355,587 | B1 | 3/2002 | Loxley et al. |
| 6,418,258 | B1 | 7/2002 | Wang |
| 6,539,155 | B1 | 3/2003 | Broeng et al. |
| 6,614,974 | B2 | 9/2003 | Elrefaie et al. |
| 6,671,442 | B2 | 12/2003 | Wang et al. |
| 6,687,445 | B2 | 2/2004 | Carter et al. |
| 6,705,126 | B2 | 3/2004 | Paek et al. |
| 6,766,088 | B2 | 7/2004 | Hasegawa et al. |
| 6,773,825 | B2 | 8/2004 | Pickrell et al. |
| 6,795,635 | B1 | 9/2004 | Fajardo et al. |
| 6,904,215 | B2 | 6/2005 | Christoff et al. |
| 6,931,188 | B2 | 8/2005 | Kersey et al. |
| 7,039,284 | B2 | 5/2006 | Nakahara et al. |
| 7,054,513 | B2 | 5/2006 | Herz et al. |
| 7,072,552 | B2 | 7/2006 | Manyam et al. |
| 7,099,552 | B1 | 8/2006 | Oron et al. |
| 7,142,758 | B1 | 11/2006 | Herz et al. |
| 7,174,078 | B2 | 2/2007 | Libori et al. |
| 2002/0197039 | A1 | 12/2002 | Carter et al. |
| 2003/0097857 | A1 | 5/2003 | Oei |
| 2004/0069019 | A1 | 4/2004 | Carter et al. |
| 2004/0071423 | A1 | 4/2004 | Libori et al. |
| 2004/0258353 | A1 | 12/2004 | Gluckstad et al. |
| 2005/0094954 | A1 | 5/2005 | Pickrell et al. |
| 2005/0111805 | A1 | 5/2005 | Hertz et al. |
| 2006/0034574 | A1 | 2/2006 | Guan et al. |
| 2007/0104437 | A1 | 5/2007 | Bookbinder et al. |
| 2008/0056657 | A1 | 3/2008 | Pickrell et al. |

FOREIGN PATENT DOCUMENTS

| | | |
|---|---|---|
| WO | 02/075393 | 9/2002 |
| WO | 02/102730 | 12/2002 |

OTHER PUBLICATIONS

Krupa, "A Laser-Based Spectometry Screening Tool May Provide Early and Efficient Detection of Breast Cancer," EurekAlert, Jul. 29, 2002, http://www.eurekalert.org/pub_releases/2002-07/aafc-als072602.php.

Sapan et al., "Review: Colorimetric Protein Assay Techniques," Biotechnol. App. Biochem., vol. 29, 1999, pp. 99-108.

Henry et al., editors, "Clinical Chemistry Principles and Technics," 2nd Edition, Harper & Row, Hagerstown, MD, 1974, pp. 449, 1070-1074, 1098-1109, 1116-1117, 1167, 1239-1240, 1246.

Feofanov et al., "Confocal Raman Microspectroscopy and Imaging Study of Theraphthal in Living Cancer Cells," Biophysical Journal, vol. 78, Jan. 2000, pp. 499-512.

Pritzker, "Cancer Biomarkers: Easier Said Then Done," Clinical Chemistry, vol. 48, No. 8, 2002, pp. 1147-1150.

Mycek et al., editors, "Handbook of Biomedical Fluorescence," Marcel Dekker Inc., 270 Maddison Avenue, New York, NY 10016, 2003, pp. 1-9, 114-123, 146-147, 152-161, 236-245, 274-279.

Lamb et al., "Challenges in Prostate Cancer Research: Animal Models for Nutritional Studies of Chemoprevention and Disease Progression," J. Nutr., vol. 135, 12 Suppl., Dec. 2005, pp. 3009S-3015S.

Kominsky, D., Pickrell, G., Stolen R., "Generation of Random-Hole Optical Fiber," Optics Letters, vol. 28, No. 16, pp. 1409-1411.

Pickrell, G., Kominsky, D., Stoloen R. et al, "Microstructural analysis of Random Hole Optical Fibers," IEEE Photonics Technology Letters, vol. 16, No. 2, Feb. 2004, pp. 491-493.

Pickrell, G., et al., "Novel Techniques for the Fabrication of Holey Optical Fibers," Fiber Optic Sensor Technology and Applications, Proceedings of SPIE, vol. 4578 (2002), pp. 271-282.

Monro et al., "Holey Fibers with Random Cladding Distributions," Optic Letters, vol. 25, No. 4; Feb. 15, 2000, pp. 206-208.

Baggett, Joanne C. et al., "Improving Bending Losses in Holey Fibers," Optical Fiber Communication conference, 2005. Technical Digest. OFC/NFOEC, Mar. 6-11, 2005, vol. 3, 3 pp.

Ellis, Federick P.K., "Fabrication of Random Hole Optical Fiber Preforms by Silica Sol-Gel Processing," Thesis to be submitted to Virginia Polytechnic Institute and State University, Feb. 19, 2004, 34 pp.

Guan, ning et al, Characteristics of Field Confined Holey Fiber Analyzed by Boundary Element Method, OFC 2002, Mar. 17-22, 2002, pp. 525-527.

Holton, Carvel et al., "Colloidal Quantum Dots Entrained in Microstructured Optical Fibers," Proceedings of SPIE, 2004, vol. 5335, pp. 258-265.

Kominsky, Daniel, "Development of Random Hole Optical Fiber and Crucible Technique Optical Fibers," Dissertation submitted to Virginia Polytechnic Institute and State University, Sep. 6, 2005, 142 pp.

Kominsky, D. et al, "Generation of Random-Hole Optical Fiber," Optics Letters, Aug. 15, 2003, vol. 23, No. 16, pp. 1409-1411.

Monro, Tanya M. et al, "Holey Fiobers with Randomly Arranged Air Holes," Conference on Lasers and electro-Optics' 2000 (CLEO 2000), pp. 607-608.

Monro, Tanya M. et al, "New Possibilities with Holey Fibers," Optical Fiber Communication Conference, 2000, vol. 3, pp. 106-108.

Pickrell, Gary et al., Fiber Optic Chemical Sensing, proceedings of SPIE, vol. 5998, Nov. 5, 2005, 15 pp.

Pickrell, Gary et al., "New Fabrication Technique for Random-Hole Optical Fibers," Proceedings of SPIE—The International Society for Optical Engineering, vol. 5589, Fiber Optic Sensor Technology and Applications III, Oct. 26-28, 2004, pp. 257-256.

Pickrell, Gary, et al., "Random-Hole Optical Fiber Evanescent-Wave Gas Sensing," Optics Letters, Jul. 1, 2004, vol. 29, No. 13, pp. 1476-1478.

Pickrell, Gary R., et al, "Random Hole Optical Fibers," Proceedings of SPIE, Industrial and Highway Sensors Technology, 2003, vol. 5272, pp. 207-215.

Richardson, D.J. et al., "Advances in Microstructured Fiber Technology," proceedings of 2005 IEEE/LEOS Workshop on Fibers and Optical Passive Components, Jun. 22-24, 2005, pp. 1-9.

Shinohara, Hiromichi, "Broadband Access in japan: Rapidly Growing FTTH Market," IEEE Communications magazine, Sep. 2005, pp. 72-78.

Bing, Y. et al., "Low-Loss Holey Fiber," Hitachi Cable Review No. 24, Aug. 2005, pp. 1-5.

Matsuo et al., "Bend-Insensitive and Low Splice-Loss Optical Fiber for Indoor Wiring in FTTH," Optical Fiber Communication Conference, 2004, Feb. 23-27, 2004, vol. 2, 3 pgs. with descriptive sheet attached.

Wu, Tzong-Lin et al., "A Novel Ultraflatened Dispersion Photonic Crystal Fiber," IEEE Photonics Technology Letters, Jan. 2005, vol. 17, No. 1, pp. 67-69.

Sapan et al., "Review: Colorimetric Protein Assay Techniques," Biotechnol. Appl. Biochem, vol. 29, 1999, pp. 99-108.

Hubmann et al., "Ultraviolet Fluorescence of Human Sera: I. Sources of Characteristic Differences in the Ultraviolet Fluorescence Spectra of Sera from Normal and Cancer-Bearing Humans," Clinical Chemistry, vol. 36, No. 11, 1990, pp. 1880-1883.

Li et al., "Proteomics and Bioinformatics Approaches for Identification of Serum Biomarkers to Detect Breast Cancer," Clinical Chemistry, vol. 48, No. 8, 2002, pp. 1296-1304.

Pena et al., "Canine Inflammatory Mammary Carcinoma: Histopahtology, Immunohistochemistry and Clinical Implications of 21 Cases," Breast Cancer Research and treatment, vol. 78, 2003, pp. 141-148.

Workman, "Review of Process and Non-Invasive Near-Infrared and Infrared Spectroscopy: 1993-1999," Applied Spectroscopy Reviews, vol. 34 (1&2), 1999, pp. 1-89.

(56) References Cited

OTHER PUBLICATIONS

Dixon et al., "Heamatology: Reduction of Methaemoglobin in Haemoglobin Samples Using Gel Filtration for Continuous Removal of Reaction Products," Nature, Jan. 28, 1967, pp. 399-400.
Dwyer et al., "Hyperspectral Imaging for Dermal Hemoglobin Spectroscopy," Part of the SPIE Conference on Subsurface Sensors and Applications, Denver, Colorado, SPIE vol. 3752, Jul. 1999, pp. 72-82.
Saptari et al., "Design of a Mechanical-Tunable Filter Spectrometer for Noninvasive Glucose Measurement," Applied Optics, vol. 43, No. 13, May 1, 2004, pp. 2680-2688.
Tran et al., "Chemical and Structural Disorder in Eumelanins: A Possible Explanation for Broadband Absorbance," Biophysical Journal, vol. 90, Feb. 2006, pp. 743-752.
Srinivas et al., "Proteomics for Cancer Biomarker Discovery," Clinical Chemistry, vol. 48, No. 8, 2002, pp. 1160-1169.
Bunn, Jr. et al., "Expression of Her-2/neu in Human Lung Cancer Cell Lines by Immunohistochemistry and Fluorescence in Situ Hybridization and its Relationship to in Vitro Cytotoxicity by Trastuzumab and Chemotherapeutic Agents,"Clinical Cancer Research, vol. 7, Oct. 2001, pp. 3239-3250.
Diamandis, "How Are We Going to Discover New Cancer Biomarkers? A Proteomic Approach for Bladder Cancer," Clinical Chemistry, vol. 50, No. 5, 2004, pp. 793-795.
Fan et al., "Targeted Therapy Against Human Lung Cancer in Nude Mice by High-Affinity Recombinant Antimesothelin Single-Chain Fv Immunotoxin," Molecular Cancer Therapeutics, vol. 1, Jun. 2002, pp. 595-600.
Jaeger et al., "Antigen-Specific Immunotherapy and Cancer Vaccines," Int. J. Cancer, vol. 106, 2003, pp. 817-820.
Kageyama et al., "Identification by Proteomic Analysis of Calreticulin as a Marker for Bladder Cancer and Evaluation of the Diagnostic Accuracy of Its Detection in Urine," Clinical Chemistry, vol. 50, No. 5, 2004, pp. 857-866.
Pritzker, "Cancer Biomarkers: Easier Said Than Done," Clinical Chemistry, vol. 48, No. 8, 2002, pp. 1147-1150.
Qu et al., "Boosted Decision Tree Analysis of Surface-Enhanced Laser Desorption/Ionization Mass Spectral Serum Profiles Discriminates Prostate Cancer from Noncancer Patients," Clinical Chemistry, vol. 48, No. 10, 2002, pp. 1835-1843.
Tudos et al., "Trends in Miniaturized Total Analysis Systems for Point-Of-Care Testing in Clinical Chemistry;".
Tudos et al., "Trends in Miniaturized Total Analysis Systems for Point-of-Care Testing in Clinical Chemistry," Lab on a Chip, vol. 1, 2001, pp. 83-95.
Dunn, Jr., "The Blood Chemistry Panel . . . An Art and a Science," http://www.thepetcenter.com/pha/cp.html, Apr. 17, 2008.
Leca-Bouvier et al., "Biosensors for Protein Detection: A Review," Analytical Letters, vol. 38, 2005, pp. 1491-1517.
Medical Encyclopedia, "Chem-20," http://www.nlm.nih.gov/medlineplus/ency/article/003468.htm, Apr. 17, 2008.
Moeller et al., "Direct Measurement of Nitric Oxide and Oxygen Partitioning into Liposomes and Low Density Lipoprotein," The Journal of Biological Chemistry, vol. 280, No. 10, Mar. 11, 2005, pp. 8850-8854.
Paul et al., "Compact Detector for Proteins Based on Two-Photon Excitation of Native Fluorescence," Analytical Chemistry, vol. 77, No. 11, Jun. 1 2005, pp. 3690-3693.
Santra et al., "Multiple-Probe Analysis of Folding and Unfolding Pathways of Human Serum Albumin," Eur. J. Biochem., vol. 271, 2004, pp. 1789-1797.
Schuh et al., "Oxygen-Mediated Heterogeneity of Apo-Low-Density Lipoprotein," Proceedings of the Natonal Academy of Sciences of the United States of America, vol. 75, No. 7, Jul. 1978, pp. 3173-3177.
Vo-Dinh et al., "Cancer Gene Detection Using Surface-Enhanced Raman Scattering (SERS)," Journal of Raman Spectroscopy, vol. 33, 2002, pp. 511-516.
Vo-Dinh et al., "Nanosensors and Biochips: Frontiers in Biomolecular Diagnostics," Sensors and Actuators B, vol. 74, 2001, pp. 2-11.

Shen et al., "Studies on the Interaction Between Ag+ and Human Serum Albumin," Journal of Inorganic Biochemistry, vol. 95, 2003, pp. 124-130.
Enejder et al., "Blood Analysis by Raman Spectroscopy," Optic Letters, vol. 27, No. 22, Nov. 15, 2002, pp. 2004-2006.
Ramanauskaite et al., "Carotenoid Levels in Human Lymphocytes, Measured by Raman Microspectroscopy," Pure & Applied Chemistry, vol. 69, No. 10, 1997, pp. 2131-2134.
Chaiken et al., "Effect of Hemoglobin Concentration Variation on the Accuracy and Precision of Glucose Analysis Using Tissue Modulated, Noninvasive, in vivo Raman Spectroscopy of Human Blood: a Small Clinical Study," Journal of Biomedical Optics, vol. 10, No. 3, 031111, May/Jun. 2005, pp. 1-12.
Sato et al., "Excitation Wavelength-Dependent Changes in Raman Spectra of Whole Blood and Hemoglobin: Comparison of the Spectra with 514.5-, 720-, and 1064-nm Excitation," Journal of Biomedical Optics, vol. 6, No. 3, Jul. 2001, pp. 366-370.
Berger et al., "Feasibility of Measuring Blood Glucose Concentration by Near-Infrared Raman Spectroscopy," Spectrochimica Acta Part A, vol. 53, 1997, pp. 287-292.
Pinzaru et al., "Hemoglobin and Human Blood Adsorption on Silver Colloidal Particles: Surface Enhanced Resonance Raman Studies," Studia Universitatis Babes-Bolyai, Physica, Special Issue, 2001, pp. 456-460.
Alden et al., "Rabi Broadening of Transient Resonance Raman Spectra of Deoxy Hemoglobin," J. Opt. Soc. Am. B., vol. 7, No. 8, Aug. 1990, pp. 1579-1585.
Wood et al., "Raman Excitation Wavelength Investigation of Single Red Blood Cells in vivo," Journal of Raman Spectroscopy, vol. 33, 2002, pp. 517-523.
Berger et al., "Multicomponent Blood Analysis by Near-Infrared Raman Spectroscopy," Applied Optics, vol. 38, No. 13, May 1, 1999, pp. 2916-2926.
Fabriciova et al., "Surface-Enhanced Raman Spectroscopy Study of the Interaction of the Antitumoral Drug Emodin With Human Serum Albumin," Biopolymers, vol. 74, 2004, pp. 125-130.
Gad, S. C., editor, 2005, Drug Discovery Handbook, Wiley-Interscience, pp. 81-83.
Dixon et al., "Haematology: Reduction of Methaemoglobin in Haemoglobin Samples Using Gel Filtration for Continuous Removal of Reaction Products," Nature, Jan. 28, 1967, pp. 399-400.
Kiefer et al., "Short Communication: Porphyrin Loading of Lipofuscin Granules in Inflamed Striated Muscle," American Journal of Pathology, vol. 153, No. 3, Sep. 1998, pp. 703-708.
Sigma-Alsrich Co., "H2500 Hemoglobin from Bovine Blood," http://www/sigmaaldich.com/catalog/search/ProductDetail?ProdNo=H2500&Brand=SIG, Dec. 12, 2005.
Tsuchida et al., "Preservation Stability and In Vivo Administration of Albumin-Heme Hybrid Solution as an Entirely Synthetic O2-Carrier," Polymers for Advanced Technologies, vol. 13, 2002, pp. 845-850.
Greim, "Review of the Career of Professor Dr. Herbert Remmer," Drug Metabolism Reviews, vol. 36, Nos. 3 & 4, 2004, pp. 407-415.
Wang et al., "Microdetermination of Proteins by Enhanced Rayleigh Light Scattering Spectroscopy With Morin," Fresenius J. Anal. Chem., vol. 364, 1999, pp. 560-564.
Yoshiki et al., "Chemiluminescence of Hemoglobin and Identification of Related Compounds with the Hemoglobin Chemiluminescence in Plasma," Photochemistry and Photobiology, vol. 73, No. 5, 2001, pp. 545-550.
Graham et al., "Biophysical Characterization of the Purified a1-Adrenergic Receptor and Identification of The Hormone Binding Subunit," The Journal of Biological Chemistry, vol. 257, No. 24, Dec. 25, 1982, pp. 15174-15181.
Qu et al., "Boosted Decision Tree Analysis of Surface-Enhanced Laser Desorption/Ionization Mass Spectral Serum Profiles Discriminates Prostate Cancer from Noncancer Patients," Clinical Chemistry, vol. 48, No. 10, 2002, pp. 1835-1843.
Rich et al., "Survey of the Year 2001 Commercial Optical Biosensor Literature," Journal of Molecular Recognition, vol. 15, 2002, pp. 352-376.

stacking an array of hollow silica tubes to form a preform. The tubes are carefully arranged to control the spacing between them and to ensure the crystalline arrangement. The preform is then heated and drawn into fibers as known in the art. The tubes generally experience a uniform scale reduction during drawing so that the tubes create the microscopic holes in the fiber.

One of the drawbacks of the conventional method for making holey optical fibers is the complexity of assembling the stack of tubes. Also, the tube-stacking method cannot be used to produce fibers with random arrays of holes.

HOLEY OPTICAL FIBER WITH RANDOM PATTERN OF HOLES AND METHOD FOR MAKING SAME

CROSS-REFERENCE TO RELATED APPLICATIONS

The present application is a continuation of U.S. patent application Ser. No. 12/263,831, filed Nov. 3, 2008, now pending, which is a continuation of U.S. patent application Ser. No. 10/863,805, filed Jun. 9, 2004, now U.S. Pat. No. 7,444,838, which claims the benefit of priority from provisional application 60/515,447, filed on Oct. 30, 2003. Related material is disclosed and claimed in U.S. patent application Ser. No. 11/929,058, filed Oct. 30, 2007, now U.S. Pat. No. 7,567,742. The disclosures of all of the above-cited applications are hereby incorporated by reference in their entireties into the present application.

FIELD OF THE INVENTION

The present invention relates generally to holey optical fibers and methods for making holey optical fibers. More specifically, the present invention relates to a new technique for making holey optical fibers having random patterns of holes. In the present method, a gas-generating material included in the fiber preform forms the holes as the fiber is drawn.

BACKGROUND OF THE INVENTION

Holey optical fibers have microscopic holes or voids for guiding light. In holey fibers, the core is solid (e.g. SiO2) and is surrounded by an array of holes containing inert gas or air. The light guided in the optical fiber may be confined to the central core region by one of two basic mechanisms. In the first mechanism, light is confined to the central core region by a refractive index difference between the core and cladding material. In conventional solid glass fibers, the refractive index difference is produced by dopants in either the core or cladding material in order to raise or lower the refractive indices of these regions. In general it is desired for the core region to have a higher refractive index than the cladding region. This can either be accomplished by doping materials such as germanium or similar elements in the core to raise the index or doping fluorine or similar in the cladding region to lower the refractive index. The index of the cladding region can also be lowered by introducing porosity in that region. The microscopic holes have a much lower refractive index compared to the solid core, so light is confined to the core. In the second type of confinement mechanism, the size and spacing of the holes is controlled in a very uniform and well defined pattern such that a photonic band gap is produced. The holes must be periodically spaced and carefully arranged and maintained in the fiber to achieve the photonic band gap effects. These fibers are often referred to as photonic crystal fibers owing to their period arrangement of air holes in the fiber. The microscopic holes provide unusual optical properties such as single-mode operation over a wide wavelength range, low zero-dispersion wavelength, and highly controllable birefringence. As a result, holey optical fibers are expected to have a wide range of applications in optical sensors and telecommunications.

Holey optical fibers are conventionally manufactured by

SUMMARY OF THE INVENTION

The present invention includes an optical fiber having a holey region with a random array of holes. In the present invention, the holes are created by gas generated during fiber drawing.

The holey region can be disposed around a fiber core, so that the holey region functions as a cladding.

The gas can be generated by nitride or carbide compounds. Silicon nitride and silicon carbide are exemplary gas generating materials. Carbides will typically produce carbon monoxide or carbon dioxide gas by decomposition and oxidation of carbon.

The holes may be filled with the gas generated during fiber drawing. The gas may be nitrogen, carbon monoxide, carbon dioxide or mixed nitrogen oxides, for example.

The random holes can have a uniform or nonuniform hole distribution.

The present invention includes a method for making the present random hole optical fiber. In the method, a preform contains the gas generating material that produces gas bubbles when heated. The preform is heated and drawn so that the gas bubbles are drawn into long holes. The preform may comprise a glass powder mixed with the gas generating material.

The gas generating material may be provided in the form of a liquid precursor. The liquid precursor may convert to a nitride or carbide material when heated.

Oxygen may be provided to the interior of the fiber preform so that the gas generating material is exposed to oxygen as it is heated.

The present invention includes a pressure sensor or force sensor having the present random hole optical fiber. The present random hole optical fiber exhibits increased optical loss when in response to applied pressure or force. Hence, the random hole fiber can be used as a pressure or force sensor by monitoring optical loss in the fiber.

DETAILED DESCRIPTION OF THE PREFERRED EMBODIMENT OF THE INVENTION

The present invention provides a holey optical fiber with a random array of holes. In the present invention, the holey optical fiber is made by including a gas-generating material in the fiber preform. In a typical embodiment, the gas generating material is located around a solid core (e.g., made of solid SiO2). The gas generating material may be a nitride ceramic (e.g., silicon nitride, rare earth nitrides, AlN, TiN) or carbide ceramic (e.g. silicon carbide, rare earth carbides) that decomposes at or close to the fiber drawing temperature (e.g., 1500-1600 Celsius in the case of pure fused silica fibers). Decomposition produces gas bubbles (e.g., $N_2$, $CO_2$, carbon monoxide or nitrogen oxides) in the molten preform material as it is drawn. The gas bubbles are randomly distributed and are drawn into long thin holes (or tubes) that remain in the optical fiber. The holes reduce the refractive index in the region surrounding the solid core, and so provide light confinement. The number and size of the holes can be influenced by the preform composition, drawing temperature, parent material particle size and drawing speed, among other factors. Though the holes have random locations, they can have non-uniform distribution by nonuniformly distributing the gas generating material.

Figure 1:
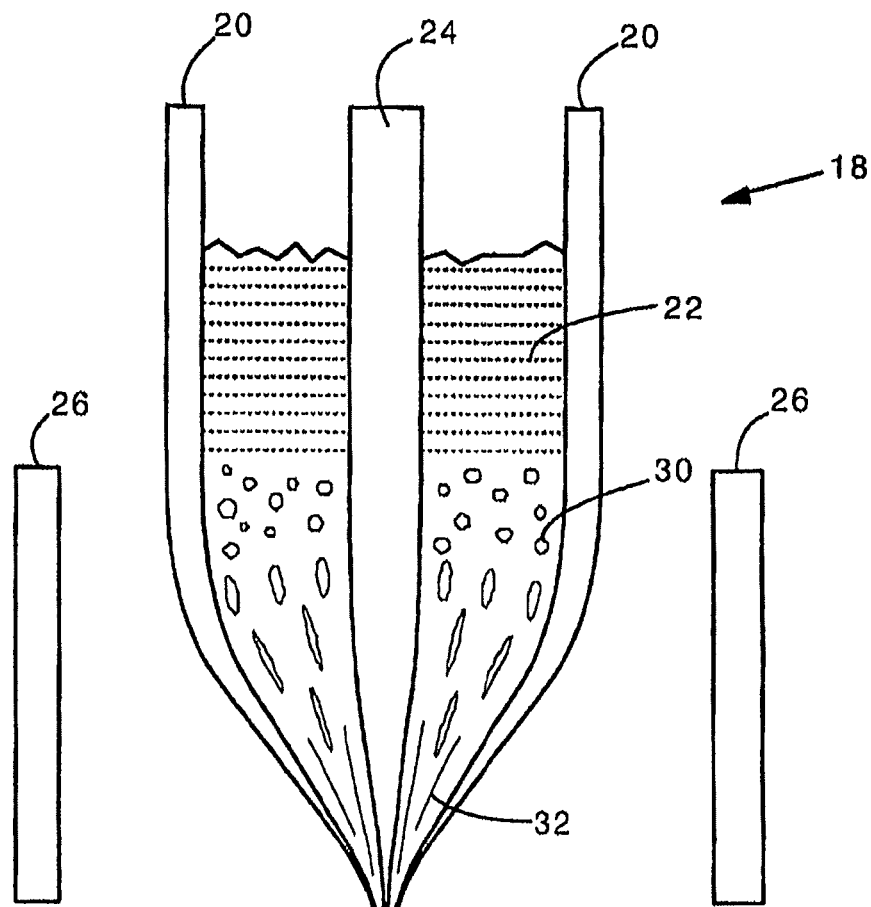
FIG. 1 illustrates the present method for making random hole optical fiber.

FIG. 1 illustrates the present method for making random-hole optical fiber. In the present method, a fiber preform 18 comprises a silica tube 20 filled with a holey region forming powder 22 and a solid silica rod 24. The holey region forming powder 22 forms a fiber cladding and the solid rod 24 forms a fiber core.

Heaters 26 heat the preform 18 so that it can be pulled to form a fiber 28, as known in the art.

The holey region forming powder 22 comprises a mixture of a glass material (e.g., high purity silica powder) and a gas-generating material (e.g., silicon nitride). The gas generating material produces a gas when heated above the sintering temperature of the glass material. The gas generating material can produce gas by thermal decomposition or by chemical reactions (e.g. oxidation) with other components of the holey region forming powder, for example. The gas generated within the holey region forming powder 22 forms trapped bubbles 30 as the holey region forming powder 22 sinters and softens. The bubbles 30 are stretched and drawn into elongated tubes 32 as the fiber 28 is pulled. In preferred embodiments, the glass material is silica, and the gas generating material is a nitride or carbide ceramic.

Figure 2:
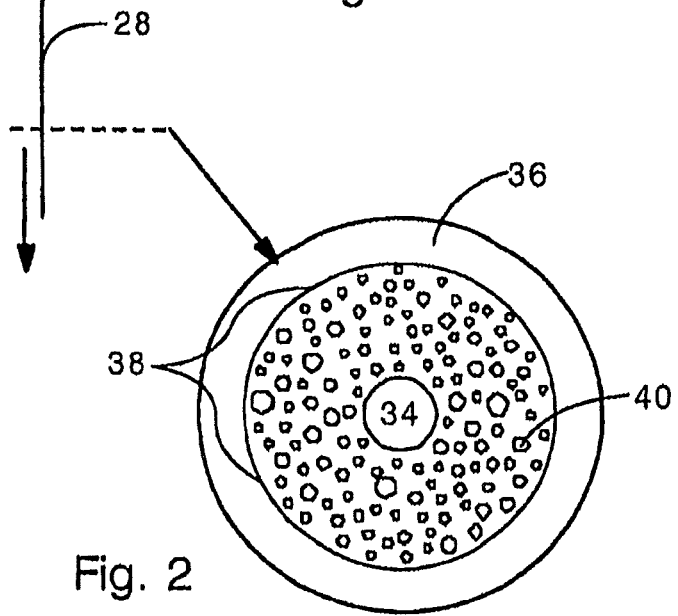
FIG. 2 shows a cross-sectional view of a random hole optical fiber.

FIG. 2 shows a magnified, cross sectional view of the present random hole optical fiber. The fiber has a core 34 formed from the solid rod 24, and a solid covering 36 formed from the tube 20. A holey region 38 provides a cladding around the core 34. The holey region is formed from the holey region forming powder 22 and contains a large number (e.g., >50 or >200) of holes 40. The holes 40 are created from the bubbles 30. The holes 40 are preferably long tubes that may be centimeters, meters, or kilometers long, for example, depending upon the size of the starting bubble in the preform and the additional gas generated (if any) during the drawing of the bubble into the tube. The holes will typically have finely tapered ends, such that the diameter of the tube will reduce in size gradually as it reaches the end. The holes may have typical diameters of 0.01-5 microns, for example, and may be even smaller at the ends. The holes can be as large as tens of microns. The holes typically lack continuity, but new ones form as old ones end so that the holey region 38 has a relatively constant porosity. The holes 40 are filled with gas and so tend to reduce the average refractive index of the cladding region 38. As a result, optical energy will be confined within the core 34 as known in the art. In preferred embodiments, the holes 40 are smaller than a wavelength of light in the fiber core, so that optical energy is minimally perturbed by individual bubbles 40. Very small holes (e.g., less than 100 nm in diameter) may be required in applications where perturbation of the optical energy is undesirable.

The holey region forming powder 20 comprises mostly glass material (e.g., high purity silica powder) with a portion of a gas generating material. The gas generating material is preferably a ceramic (e.g., nitride or carbide) that generates gas at or close to the temperature required for fiber drawing. For example, the gas generating material can generate gas at temperatures in the range of about 1000-1600 C for silica fibers. The gas generating material should generate gas at temperatures above the sintering temperature of the holey region forming powder so that generated gas is trapped and cannot escape. The gas can be generated by decomposition and/or oxidation, for example. The gas that forms the bubbles 30 can be any gas, but is preferably a relatively inert gas that does not interfere with desired light transmission properties of the optical fiber.

In a preferred embodiment, the gas generating material is silicon nitride. The silicon nitride can be a powder mixed into the holey region forming powder 22. Alternatively, the silicon nitride can be a coating on the particles of glass material. Silicon nitride is a preferred material for generating the gas bubbles 30 because it produces a relatively large amount of gas at the drawing temperature, and because it oxidizes to SiO2 (a preferred fiber material) during drawing. Silicon nitride is a preferred gas generating material when silica is the glass material.

Silicon nitride can be present in amounts less than about 1% by weight of the holey region forming powder when the balance is silica. In optical fibers manufactured by the present inventors, silicon nitride comprises about 0.01-0.5%, or, more typically, 0.04-0.1% of the holey region forming powder by weight, with the balance of the holey region forming powder being high purity silica. The amount of silicon nitride will influence the porosity of the holey region. Larger amounts of silicon nitride will tend to produce higher porosity, and hence, a relatively lower average refractive index in the holey regions.

The porosity of the holey region can vary widely. For example, the present invention can produce porosities from less than 1% to 95% and higher. Low porosities can be used in the cladding region of index-guiding fiber. High porosities can be used to reduce optical loss from Rayleigh scattering, for example.

While not wishing to be limited to a specific mechanism, it is believed by the present inventors that silicon nitride produces gas by oxidation during drawing. Oxygen present in the holey region forming powder oxidizes the silicon nitride, producing $SiO_2$, and nitrogen or nitrogen oxides or some mixture thereof. Oxygen might also oxidize the nitrogen to form mixed nitrogen oxides. The oxygen may be adsorbed on the surfaces of holey region forming powder particles, may be trapped in voids during sintering, or may be dissolved in the silica. Oxygen bound to silica may also contribute to the oxidation. The nitrogen and nitrogen oxide gases may remain in the holes of the final, drawn fiber.

It is noted that oxygen or other gases (e.g., inert gases) may be incorporated into the holey region forming powder during drawing. For example, flowing oxygen gas into the holey region forming powder may increase the oxidation of the silicon nitride and gas generation. The fiber preform can also be filled with ambient air. Solid oxygen sources (e.g., nitrates) can also be incorporated into the holey region forming powder.

The holey region forming powder can have a wide range of particle sizes. Typical fibers made by the present inventors have employed 325 mesh and 100 mesh silica powder and sub-micron diameter silicon nitride powder. Other particle sizes can also be used and may influence the size of the holes 40 or porosity of the holey region. The size of the powder particles can affect the sintering temperature and amount of gas generated. If mixtures of powders are used, they should be thoroughly mixed before drawing, unless non-uniform hole distributions are desired.

It is noted that pre-oxidation of the gas generating material, drawing speed, pulling force and drawing temperature may also influence the porosity of the holey regions or the size of the holes.

The glass material of the holey region forming powder is preferably high purity silica. However, other glassy materials can be used instead. For example, fluoride-containing glasses, borosilicate glasses, or other optical glasses can be used instead of silica. These other glasses may require different drawing conditions (e.g. different temperatures, absence of oxygen) and so may require use with specific gas generating materials.

Silicon carbide can also be used as the gas generating material. Silicon carbide tends to oxidize in the presence of oxygen at high temperature, forming $SiO_2$ and carbon monoxide or carbon dioxide. The carbon monoxide or carbon dioxide provides the bubbles 30. The oxygen source can be elemental oxygen present in the preform. Pure gaseous oxygen can be flowed into the preform to increase the amount of available oxygen. However, it has been empirically observed that silicon carbide tends to form less gas than silicon nitride, on a weight percentage basis. For this reason, the holey region forming powder may require more than 1% by weight silicon carbide (e.g., 1-5%) for adequate gas generation, when combined with silica. Of course, the required amount of silicon carbide depends upon the desired porosity and application of the optical fiber.

Many materials other than silicon nitride and silicon carbide can be used as the gas generating material. It is noted that, in general, the gas generating material should have the following characteristics:

1) The gas generating material should produce gas at a temperature at or above the sintering temperature of the holey region forming powder. If the gas generating material produces all of its gas at a temperature below the sintering temperature of the powder, then gas will not be trapped within the preform, and bubbles will not be formed. Sintering temperature will be affected by heating duration, particle size, particle compaction, and particle surface chemistry. For example, 325 mesh silica powder typically can be sintered at about 1000-1500 Celsius. Silicon nitride is suitable for use with silica because it continues to produce gas at typical silica sintering temperatures.

2) The gas generating material should produce gases that do not impair desired optical properties of the optical fiber. In many cases, and depending upon the application, the reaction products of the gas generating material must not exhibit too high of optical losses to the propagating signal. Silicon nitride meets this guideline because the nitrogen, nitrogen oxides and $SiO_2$ do not interfere with optical transmission significantly in most of the wavelength regions of interest (e.g., optical and near-infrared).

It is noted that many nitride materials can be used as the gas-generating material. Examples of possible nitride materials that can be used include aluminum nitride, titanium nitride, rare earth metal nitrides (e.g. erbium nitride, nyodimuim nitride), and boron nitride. Other metal nitrides or intermetallic nitrides can also be used. Metal nitrides and intermetallic nitrides tend to decompose at high temperature, or oxidize in the presence of oxygen, thereby forming gas bubbles of nitrogen or nitrogen oxides.

Also, many carbide materials can be used as the gas generating material. Carbide materials that can be used include aluminum carbide, titanium carbide, rare earth carbides and other metal or intermetallic carbides. Carbide materials tend to decompose and oxidize into carbon dioxide and carbon monoxide in the presence of oxygen.

Also, nitrate and carbonate compounds may be used as the gas generating material. The nitrate or carbonate material should be a metal compound. For example, sodium nitrate or sodium carbonate can be used. Nitrates will form nitrogen, nitrogen oxides, and possibly oxygen; carbonates will form carbon dioxide, carbon monoxide and possibly oxygen. The nitrate or carbonate material can be added to the preform as a powder, or an aqueous solution, for example. Other nitrates or carbonates that can be used include potassium nitrate or carbonate, rare earth nitrates and carbonates, and aluminum nitrate or carbonate.

Rare earth metal nitrides, carbides, nitrates and carbonates, in addition to providing gas bubbles, can provide rare earth dopants (e.g., erbium, neodymium, etc.) or other dopants with desirable optical functions such as optical amplification, fluoresence or frequency shifting. Other dopants can also be incorporated into the fiber. Useful optical properties of rare earth dopants and other dopants are known in the art.

It is also noted that rare earth dopants or other dopants can be incorporated into the holey region forming powder as dopants in the glass material.

In another aspect of the invention, a liquid precursor material is used to provide the gas generating material. The liquid precursor can decompose with heating to produce carbides or nitrides that subsequently release bubble-forming gas. In this embodiment, the liquid precursor is mixed with glass powder to form the holey region forming powder. The holey region forming powder will be a slurry or paste in this embodiment. The liquid precursor can be a polysilizane (e.g. polyureasilizane), alumoxane, or polyurethane, or other suitable liquid as know in the art to produce solid compounds that generate gases when heated. Specifically, these liquid materials are known to form nitrides and carbides when heated. The choice of liquid precursor will in general be subject to the considerations addressed above, including decomposition temperature, gases produced and resulting oxidation processes. An advantage of using a liquid precursor is that the liquid forms coatings or particles of gas generating material with extremely high uniformity. For example, the liquid precursor may form a thin coating of gas generating material on each particle of glass material in the holey region forming powder. A coating on each particle will tend to produce more uniform distribution of gas generating material compared to a mixture of particles. A highly uniform distribution of gas generating material will tend to create a highly uniform distribution of holes, and holes with smaller sizes. Uniform hole distribution and small hole size are typically preferred in optical fiber applications.

Figure 3:
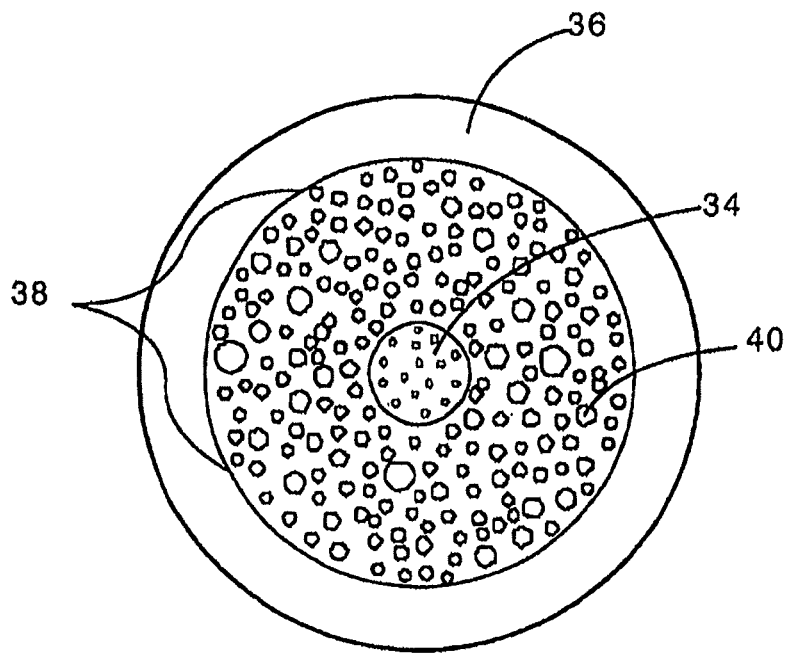
FIG. 3 shows a cross-sectional view of a fiber having random holes in the core.

To control the amount of gas generating material created by the liquid precursor, the liquid precursor can be diluted with a solvent. A highly diluted liquid precursor material will tend to produce fewer bubbles and lower porosity in the optical fiber. Solvents that can be used include alcohol, chlorinated hydrocarbons, acetates, ethers, etc., depending upon the liquid precursor used, with different solvents being suitable for different precursors, as known in the art. 4h FIG. 3 shows an alternative optical fiber that has holes in the core region 34. This fiber can be made by replacing the solid rod 24 of FIG. 1 with a column of glass powder having a lower concentration of gas generating material. The glass powder can be disposed within a hollow tube so that it has a well defined diameter. The hollow tube could be made of glass and remain during the draw or could be withdrawn before the fiber drawing occurs so that the tube is not incorporated into the fiber. Alternatively, the tube could be made from a thin polymeric material that vaporizes at low temperature. A possible advantage of providing holes in the core region is that it could reduce Rayleigh scattering and optical loss by minimizing the amount of glass material in the core. In order to reduce Rayleigh scattering as much as possible, high porosities may be desirable. For example, the core may have a 97% porosity and the cladding a 98% porosity.

Figure 4:
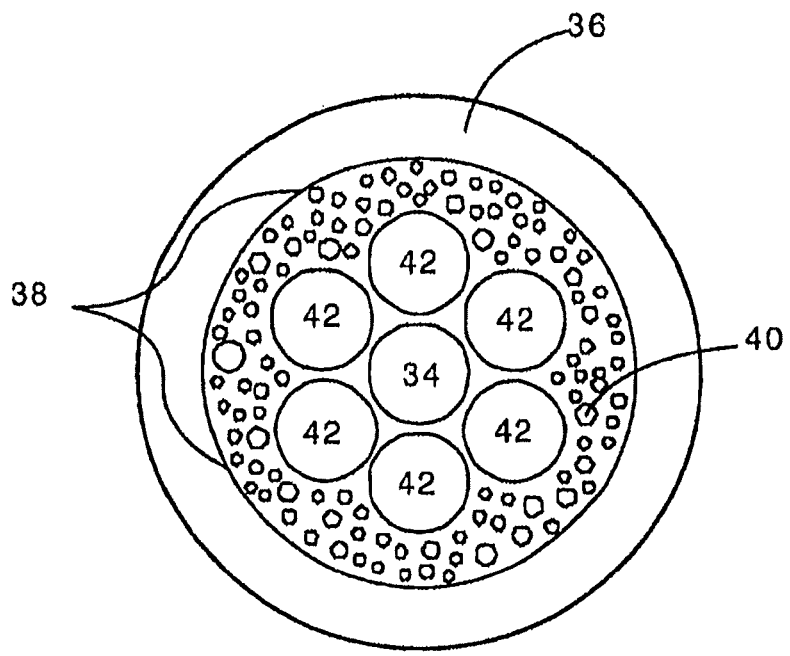
FIG. 4 shows a cross sectional view of a fiber having random holes in combination with holes made from stacked tubes.

Many other fiber structures are also possible in the present invention. FIG. 4, for example, shows a cross-section of an optical fiber with random holes generated by gas 40, in combination with an organized array of six holes 42 formed from drawn hollow glass tubes. This embodiment can be created by stacking six hollow glass tubes around the solid rod 34 in the preform of FIG. 1, as known in the conventional art of making holey fibers. The space around the tubes is filled with holey region forming powder.

Figure 5:
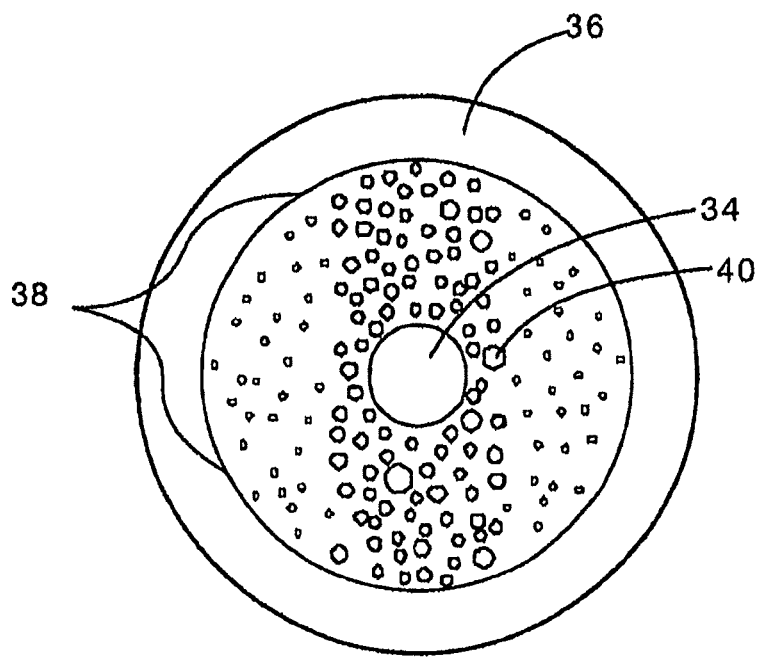
FIG. 5 shows a cross sectional view of a fiber having a non-uniform distribution of random holes.

FIG. 5 shows a cross-section of an optical fiber with a non-uniform distribution of random holes 40. The fiber of FIG. 5 may have strong birefringence and may have useful polarization maintaining properties. The fiber of FIG. 5 can be made by non-uniformly distributing gas generating material in the preform. Alternatively, the fiber of FIG. 5 can be made by including large D-shaped solid glass rods in the preform.

Figure 6:
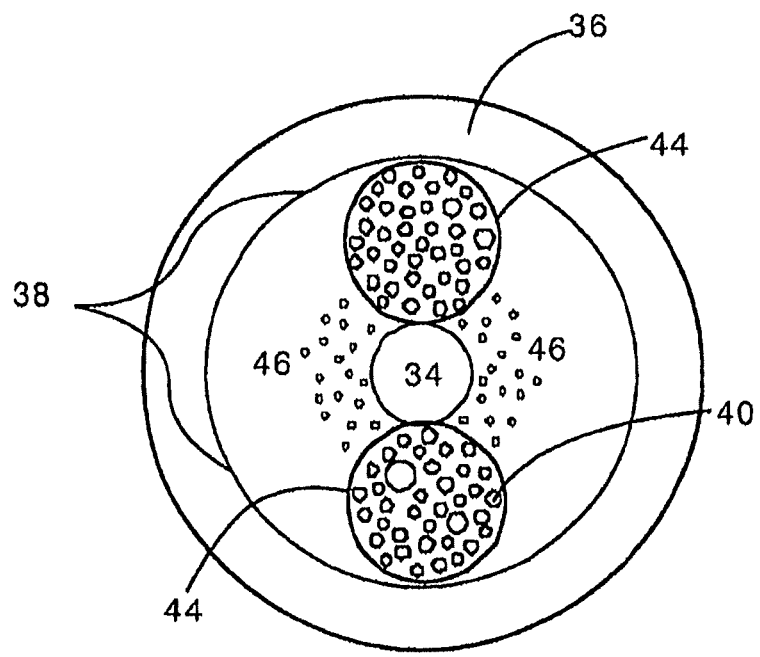
FIG. 6 shows a cross sectional view of a fiber having a non-uniform distribution of random holes in which the random holes are confined by hollow tubes.

FIG. 6 shows another embodiment of the invention in which holey regions are confined within two drawn hollow glass tubes 44. Areas 46 outside the tubes 44 may be created from glass powder lacking gas generating material or having a smaller amount of gas generating material. The fiber of FIG. 6 can be made by packing tubes 44 with holey region forming powder before drawing.

It is noted that many different fiber structures can be made by combining gas generating powder with glass powder, hollow glass tubes, and solid glass tubes. Holey regions can be localized by disposing gas generating material within a hollow glass tube. Solid regions can be created from glass powder lacking gas generating material or from using solid glass elements. An infinite variety of structures are possible within the scope of the present invention.

The present random hole optical fibers are pressure sensitive and can be used in pressure and force sensing applications, Specifically, the random hole fiber experiences an increase in optical loss when pressure is applied in a direction orthogonal to the fiber axis, or when the pressure is hydrostatically applied.

The optical loss of the random hole fiber varies with wavelength. The loss is generally greater for relatively short wavelengths (e.g., wavelengths shorter than 600 nm) than for long wavelengths. However, the wavelength dependence of loss is complex and a function of the physical structure of the fiber.

The random hole fiber is sensitive to linear force, and to isotropic hydrostatic pressure applied by a fluid medium. A linear force can be applied by placing a weight on top of the fiber, for example.

Figure 7:
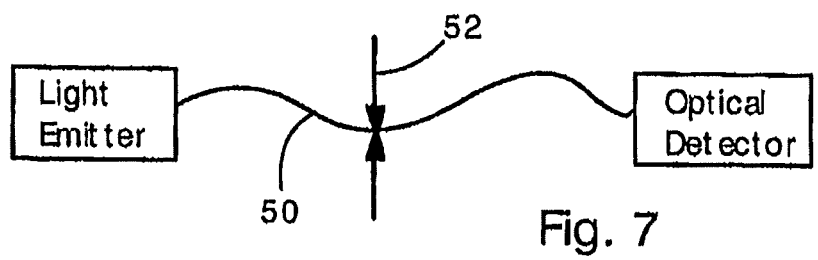
FIG. 7 shows a pressure sensor according to the present invention.

FIG. 7 shows a simple pressure sensor according to the present invention having a section of random hole optical fiber 50. The optical loss of the optical fiber is responsive to applied pressure 52. The applied pressure can therefore be determined by monitoring the loss of the fiber with an optical detector.

Figure 8:
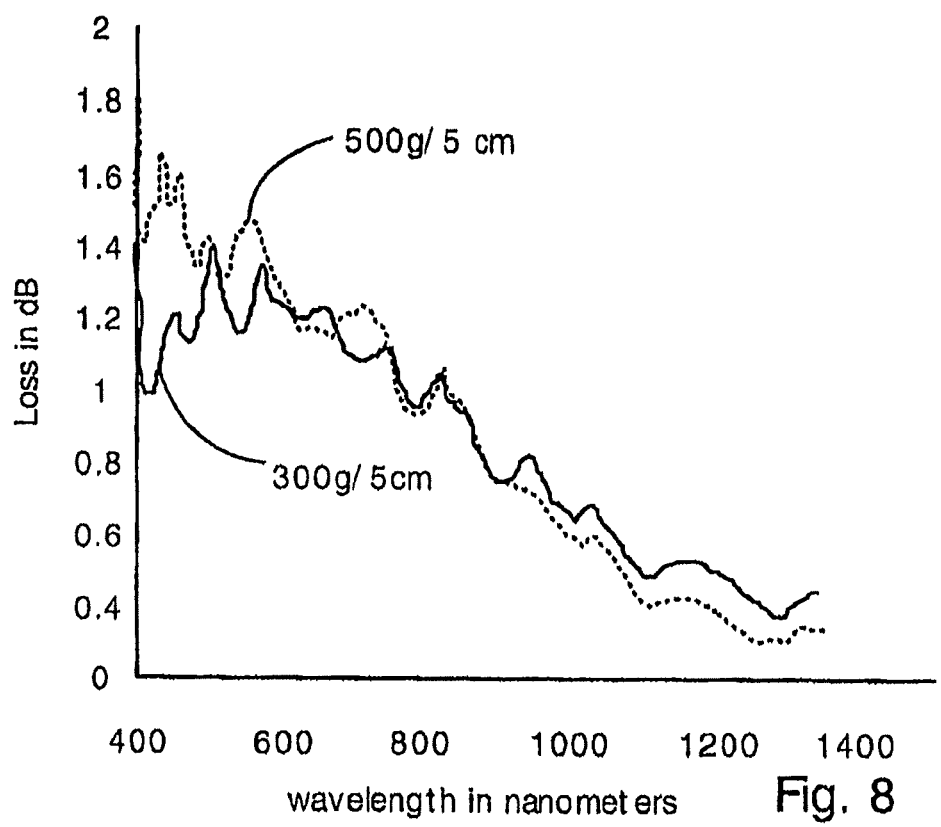
FIG. 8 shows plots of loss versus wavelength when 500 gram and 300 gram weights are rested on a random hole fiber.

FIG. 8 shows plots of optical loss as a function of wavelength for a random hole optical fiber. The fiber has a solid core and a holey cladding, like the fiber of FIG. 2. FIG. 8 illustrates the optical loss when a 300-gram weight rests on a 5 centimeter length of the fiber, and the optical loss when a 500-gram weight rests on a 5 centimeter length of the fiber. The optical loss increases substantially in the short wavelength (i.e. less than 600 nm) as the weight is increased. The optical loss continues to increase as the weight is increased beyond 500 grams, although this is not illustrated. Optical loss can be used to determine pressure or force applied to the fiber.

Figure 9:
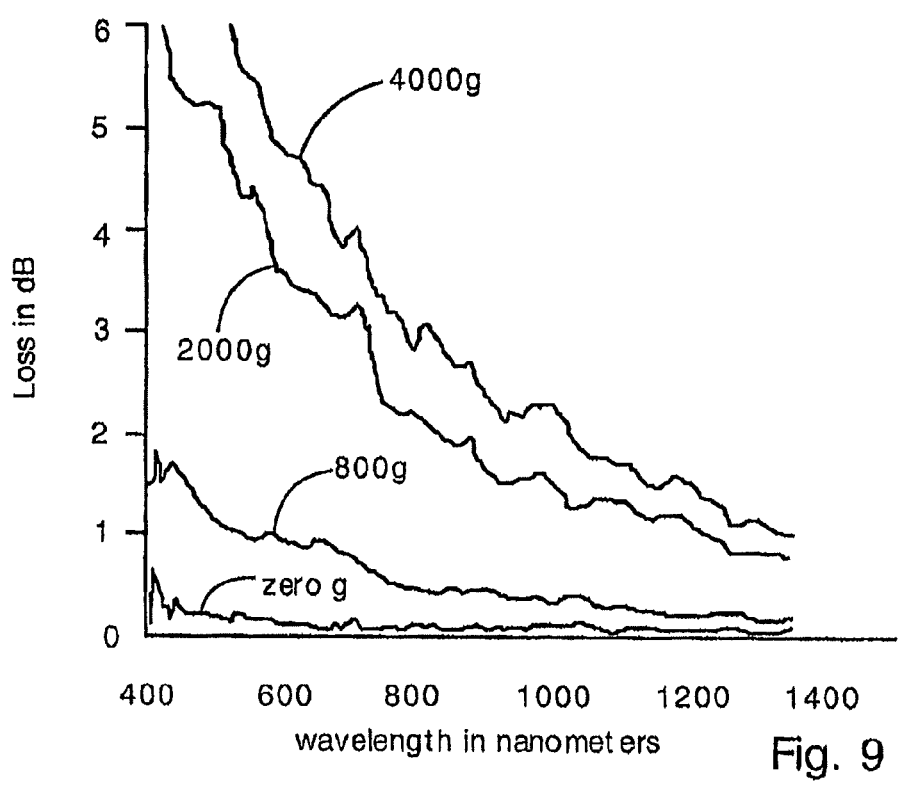
FIG. 9 shows plots of loss versus wavelength when 4000, 2000, and 800 gram weights are rested on a random hole fiber.

FIG. 9 shows plots of optical loss as a function of wavelength for a random hole fiber different from the fiber used to generate FIG. 8. The fiber used to generate FIG. 9 has a solid core and a holey cladding, like the fiber of FIG. 2. FIG. 9 illustrates the optical loss when 4000 g, 2000 g, and 800 g, weights rest on 2.85 centimeter lengths of the fiber. Also, the loss with zero pressure applied (zero weight) is also shown. From FIG. 9 it is clear that the optical loss increases dramatically with increasing pressure.

It is noted that the optical loss due to pressure or applied force is repeatable and does not exhibit hysteresis. Repeated tests confirm that applied pressure does not produce permanent alterations in the optical loss of the fiber. Also, it is noted that the optical loss is relatively insensitive to temperature changes. These features make the present random hole optical fibers ideal for applications in pressure and force sensing applications. Also, the relative lack of pressure sensitivity in the longer wavelengths provides a ready means for calibrating such a sensor, and providing self-calibration during operation.

Additionally, it is noted that the pressure measurement provided by optical loss variations is a distributed measurement. The optical loss is a function of the pressure magnitude in addition to the length of fiber experiencing the pressure.

While not wishing to be limited to a specific mechanism, it is believed that pressure induced loss in the random hole optical fibers is a result of stress induced birefringence, optical tunneling, or highly localized microbends. The random pattern of holes may create nonuniform structural deformation in the fiber, and therefore loss-inducing microbends.

The present random hole optical fiber can be used to sense force or pressure in a wide range of sensing applications. The fiber can be used to detect pressure by monitoring the amount of optical loss detected.

The present method for making random hole optical fiber provides several significant advantages including ease of fabrication, potential for continuous fiber drawing, and lower fabrication costs compared to convention techniques for making holey fiber.

It will be clear to one skilled in the art that the above embodiment may be altered in many ways without departing from the scope of the invention. Accordingly, the scope of the invention should be determined by the following claims and their legal equivalents.

What is claimed is:
1. An optical fiber comprising:
 a core composed of a glass of a refractive index; and
 a cladding region composed of the same glass of the same refractive index, wherein the cladding region contains tubes which are random in diameter, length and radial position within the cladding region, and wherein the tubes taper on the ends.

2. The fiber of claim 1, wherein the ends of the tubes are tapered such that significant scattering of light does not occur.

3. The fiber of claim 1, wherein an optical loss of the fiber is less than 1 dB/m.

4. The fiber of claim 3, wherein the optical loss as measured at 1550 nm is less than 0.5 dB/m.

5. The fiber of claim 3, wherein the optical loss as measured at 1310 nm is less than 0.5 dB/m.

6. The fiber of claim 3, wherein the optical loss as measured at 850 nm is less than 0.5 dB/m.

7. The fiber of claim 3, wherein the optical loss as measured in the range between 1550 and 1700 nm is less than 0.5 dB/m.

8. The fiber of claim 3, whereby the optical loss induced by a half inch diameter bend in the fiber is less than 0.5 dB.

9. The fiber of claim 3, wherein the optical loss induced by a half inch diameter bend in the fiber is less than 0.5 dB and more preferably less than 0.1 dB when measured at a wavelength of 850 nm.

10. The fiber of claim 3, wherein the optical loss induced by a half inch diameter bend in the fiber is less than 0.5 dB and more preferably less than 0.1 dB when measured at a wavelength of 1310 nm.

11. The fiber of claim 3, wherein the optical loss induced by a half inch diameter bend in the fiber is less than 0.5 dB and more preferably less than 0.1 dB when measured at a wavelength of 1550 nm.

12. The fiber of claim 3, wherein the optical loss induced by a half inch diameter bend in the fiber is less than 0.5 dB and more preferably less than 0.1 dB when measured in thea wavelength range from of 1550-1700 nm.

13. The fiber of claim 1, wherein the core of the fiber when viewed in cross-section is located at a center of the fiber, such that a center of the core is coincident with the center of the fiber.

14. The optical fiber of claim 1, wherein optical confinement is achieved by incorporation of the tubes into the fiber such that an interface between a solid central glass region and a surrounding region containing the tubes defines an interface between the core and cladding region.

15. The fiber of claim 14, wherein the tubes in the cladding region lower an average effective refractive index of that region, thereby producing a difference in refractive index between the core and cladding region necessary for optical confinement to be achieved in the core of the fiber.

16. The fiber of claim 15, wherein the tubes are random in diameter, random in length and random in spatial position within the cladding region and such that if the tubes were not present, no cladding would exist.

17. The fiber of claim 16, wherein the tubes in the cladding region end by forming a tapered region such that an inner diameter of the tube decreases continuously to a very small value relative to an initial diameter of the tube.

18. The fiber of claim 17, wherein the tubes are adiabatically tapered.

* * * * *